(12) United States Patent
Lentini et al.

(10) Patent No.: US 12,303,059 B2
(45) Date of Patent: May 20, 2025

(54) AUTOMATED COUNTERTOP EGG COOKER

(71) Applicant: Bridge Appliances, Inc., Portsmouth, NH (US)

(72) Inventors: Lance Lentini, Portsmouth, NH (US); Ivan Galic, Manchester, NH (US); Keller Waldron, Kensington, NH (US); Connor White, Portland, ME (US); Thomas M. O'Brien, Rochester, NH (US)

(73) Assignee: Bridge Appliances, Inc., Portsmouth, NH (US)

( * ) Notice: Subject to any disclaimer, the term of this patent is extended or adjusted under 35 U.S.C. 154(b) by 0 days.

(21) Appl. No.: 18/640,183

(22) Filed: Apr. 19, 2024

(65) Prior Publication Data

US 2024/0341517 A1 Oct. 17, 2024

Related U.S. Application Data

(63) Continuation of application No. 17/553,308, filed on Dec. 16, 2021, now Pat. No. 11,992,146.

(60) Provisional application No. 63/126,875, filed on Dec. 17, 2020.

(51) Int. Cl.
*A47J 29/02* (2006.01)
*A47J 43/14* (2006.01)

(52) U.S. Cl.
CPC .............. *A47J 29/02* (2013.01); *A47J 43/145* (2013.01)

(58) Field of Classification Search
CPC .......... A47J 29/00; A47J 29/02; A47J 43/145; A47J 36/32
See application file for complete search history.

(56) References Cited

U.S. PATENT DOCUMENTS

| | | | | |
|---|---|---|---|---|
| 2,371,783 A | * | 3/1945 | Sneed | B65G 17/32 |
| | | | | 198/534 |
| 2,761,375 A | * | 9/1956 | Jepson | A47J 29/00 |
| | | | | 99/344 |
| 3,929,234 A | * | 12/1975 | Warren | B65B 23/08 |
| | | | | 53/247 |

(Continued)

FOREIGN PATENT DOCUMENTS

| | | |
|---|---|---|
| CN | 2804749 Y | 8/2006 |
| TW | 201924538 A | 7/2019 |

OTHER PUBLICATIONS

International Search Report and Written Opinion received for International Patent Application No. PCT/US2021/072968 mailed on Mar. 21, 2022, 10 pages.

(Continued)

*Primary Examiner* — Sean M Michalski
(74) *Attorney, Agent, or Firm* — Morrison & Foerster LLP

(57) ABSTRACT

Provided are kitchen devices for cooking eggs using various cooking methods. For example, kitchen devices provided herein comprise a storage component configured to store a plurality of raw eggs, a cracking component configured receive a raw egg of the plurality of raw eggs from the storage component and crack the raw egg, forming a cracked egg, a cooking component configured to receive the cracked egg from the cracking component and cook the cracked egg, forming a cooked egg, and a warming component configured to receive the cooked egg from the cooking component and warm the cooked egg.

20 Claims, 13 Drawing Sheets

(56) References Cited

U.S. PATENT DOCUMENTS

| | | | | | |
|---|---|---|---|---|---|
| 4,134,333 | A | * | 1/1979 | Warren | A01K 43/00 99/498 |
| 4,411,574 | A | * | 10/1983 | Riley | B65G 47/918 414/416.07 |
| 5,203,252 | A | * | 4/1993 | Hsieh | A47J 37/0871 219/521 |
| 5,281,431 | A | * | 1/1994 | Dunckel | A23B 5/0057 426/399 |
| 5,377,583 | A | * | 1/1995 | Tomosue | A47J 43/145 99/497 |
| 5,702,245 | A | * | 12/1997 | London | F26B 15/26 99/443 C |
| 6,095,038 | A | * | 8/2000 | Cerro | A23J 1/09 99/497 |
| 6,149,375 | A | * | 11/2000 | Hebrank | A01K 45/007 414/404 |
| 6,327,966 | B1 | * | 12/2001 | Bergmeier | A47J 29/02 99/336 |
| 6,595,114 | B1 | * | 7/2003 | Endres | A47J 37/0611 99/395 |
| 7,467,504 | B2 | * | 12/2008 | Mate | B65G 47/918 53/247 |
| 7,690,706 | B2 | * | 4/2010 | Wild | B65G 47/918 294/87.1 |
| 8,276,505 | B2 | * | 10/2012 | Buehler | A47J 44/00 99/348 |
| 8,820,219 | B2 | * | 9/2014 | Buehler | A47J 44/00 134/115 R |
| 9,687,110 | B2 | * | 6/2017 | Lee | A47J 37/105 |
| 2002/0197363 | A1 | * | 12/2002 | Shefet | B65G 21/18 426/315 |
| 2005/0193901 | A1 | * | 9/2005 | Buehler | A23L 5/10 99/468 |
| 2007/0017384 | A1 | * | 1/2007 | Serra | A47J 37/0611 99/372 |
| 2008/0041237 | A1 | * | 2/2008 | Bonsell | A47J 29/04 99/327 |
| 2013/0008475 | A1 | * | 1/2013 | Robinson | A01K 43/04 134/115 R |
| 2013/0101714 | A1 | * | 4/2013 | Buehler | A23L 5/10 99/341 |
| 2013/0213773 | A1 | * | 8/2013 | Talsma | B65G 21/18 198/850 |
| 2014/0050834 | A1 | * | 2/2014 | Berge | A47J 37/0676 99/422 |
| 2015/0150413 | A1 | * | 6/2015 | Lee | A47J 37/067 99/424 |
| 2015/0216357 | A1 | * | 8/2015 | Josephson | A47J 29/00 219/732 |
| 2015/0290795 | A1 | * | 10/2015 | Oleynik | B25J 9/0081 700/257 |
| 2016/0029838 | A1 | * | 2/2016 | Freymiller | A47J 37/0611 99/376 |
| 2016/0174748 | A1 | * | 6/2016 | Baldwin | A47J 36/321 99/330 |
| 2017/0323640 | A1 | * | 11/2017 | Sisodia | A23L 5/10 |
| 2018/0203729 | A1 | * | 7/2018 | Kapinos | G06F 9/4887 |
| 2019/0159624 | A1 | * | 5/2019 | Lee | A47J 43/145 |
| 2019/0320851 | A1 | * | 10/2019 | Ramirez-Hernan | A47J 43/145 |
| 2020/0196646 | A1 | * | 6/2020 | Gildersleeve, III | A23B 5/041 |
| 2022/0358922 | A1 | * | 11/2022 | Srivastava | G06F 3/167 |
| 2023/0031545 | A1 | * | 2/2023 | Oleynik | G05B 19/42 |

OTHER PUBLICATIONS

Extended European Search Report and Written Opinion received for European Patent Application No. 21908046.2 mailed on Sep. 11, 2024, 12 pages.

Lentini et al, U.S. Office Action dated Jun. 13, 2023, directed to U.S. Appl. No. 17/553,308; 18 pages.

* cited by examiner

AUTOMATED COUNTERTOP EGG COOKER

CROSS REFERENCE TO RELATED APPLICATIONS

This application is a continuation of U.S. application Ser. No. 17/553,308, filed Dec. 16, 2021, which claims priority to U.S. Provisional Application No. 63/126,875, filed Dec. 17, 2020, the entire contents of each of which are incorporated herein by reference.

FIELD OF THE DISCLOSURE

This disclosure relates to kitchen devices, and more particularly, to kitchen devices for storing, preparing, and cooking eggs.

BACKGROUND OF THE DISCLOSURE

Kitchen devices can perform various specialized functions. Often, kitchen devices can minimize the amount of time, labor, and cleanup required to prepare and cook food. Generally, a specific kitchen device helps a user by either aiding in the preparation of the food, or by aiding in the cooking of the food. One example of a conventional kitchen device, a blender, helps a user in food preparation by liquefying, chopping, or pureeing food. A food processor, another type of conventional kitchen device, also helps in food preparation in a similar manner. These devices reduce the amount of time and labor that would otherwise be required using manual methods by liquefying, chopping, or pureeing.

A microwave oven, on the other hand, is a conventional kitchen device that helps a user by cooking food. A toaster oven, a slow cooker, and a rice cooker are other examples of conventional kitchen devices that aid in food cooking. Each of these items reduce the amount of time and labor that would otherwise be required if cooking using more traditional methods (e.g., using an oven, cooking over a fire).

SUMMARY OF THE DISCLOSURE

Provided are kitchen devices that can store, prepare, and cook eggs. Unlike conventional kitchen devices, which are designed to perform a single, specific function, the kitchen devices provided herein can refrigerate raw eggs and store them until ready to use, prepare the raw eggs by cracking them, and cook the cracked eggs using any of various cooking methods. For example, the kitchen devices provided herein can cook the eggs to form scrambled eggs, sunny-side up eggs, over easy eggs, and omelets, among other variations. Thus, unlike conventional kitchen devices, such as those described above, the kitchen devices described herein can perform both food preparation and food cooking functions, further reducing the amount of time and labor required by a user to achieve a cooked food product. In some embodiments, the kitchen devices provided herein are also self-cleaning, which further reduces the amount of time and labor inherently involved in preparing and cooking food using conventional methods.

As described above, in most cases, kitchen devices perform a single specific function. For example, a blender can prepare food by liquefying, chopping, or pureeing various types of food. However, a blender does not store the food prior to blending, it does not peel or slice/cut food prior to blending, if necessary, and in most cases, it does not achieve a final food product. A toaster exposes sliced bread to heat to brown the bread, or generate toast. However, the toaster does not store the bread prior to toasting, and it does not slice the bread. And a microwave oven cooks food, but it cannot store or prepare the food prior to cooking. Thus, most conventional kitchen devices are very limited in their abilities. This limitation requires a person to obtain more kitchen devices and/or kitchen tools to serve his or her needs. More kitchen devices generally translates to increased cost, decreased space in the kitchen (e.g., countertop space or cabinet storage space occupied by the increased number of kitchen devices), and increased cleaning.

For example, to cook scrambled eggs using conventional methods, one would need to have storage space to hold the eggs until he or she is ready to cook them (i.e., space in a refrigerator), tools to effectively crack the egg, cookware to cook the egg (e.g., pan, spatula), and a heat source to cook the egg on (e.g., hot plate, stovetop). Accordingly, cooking eggs using conventional methods requires at least four different types of devices/tools that each serve a different, specialized function.

However, kitchen devices provided herein can reduce the number of devices and tools needed to store, prepare, and cook food. Specifically, kitchen devices provided herein can store, prepare, and cook eggs a number of various ways, eliminating the need for extraneous devices or tools. This also inherent reduces the amount of cleaning required. Instead of cleaning four or more kitchen devices and tools, a user now only needs to clean one when using a kitchen device provided herein. Further, kitchen devices provided herein can include a closed-loop cleaning system to eliminate or decrease the amount of cleaning a user must manually do to keep the device sanitary and in proper working order.

In some embodiments, provided is a kitchen device for cooking eggs, the kitchen device comprising: a storage component configured to store a plurality of raw eggs; a cracking component configured receive a raw egg of the plurality of raw eggs from the storage component and crack the raw egg, forming a cracked egg; a cooking component configured to receive the cracked egg from the cracking component and cook the cracked egg, forming a cooked egg; and a warming component configured to receive the cooked egg from the cooking component and warm the cooked egg.

In some embodiments of the kitchen device, the plurality of raw eggs comprises six or twelve eggs.

In some embodiments of the kitchen device, the storage component is cooled to a temperature of 5 to 40° F. to refrigerate the plurality of raw eggs.

In some embodiments of the kitchen device, the storage component comprises a tray configured to hold the plurality of raw eggs.

In some embodiments of the kitchen device, the tray comprises a plurality of cups, wherein each cup of the plurality of cups is configured to hold one raw egg of the plurality of raw eggs.

In some embodiments of the kitchen device, the storage component comprises a transfer mechanism configured to transfer the raw egg from a first cup of the plurality of cups to a second cup of the plurality of cups.

In some embodiments of the kitchen device, a gravitational mechanism is configured to transfer the raw egg from the second cup of the plurality of cups to the cracking component of the kitchen device.

In some embodiments of the kitchen device, the storage component comprises a transfer mechanism comprising a helical coil configured to transfer the raw egg of the plurality of raw eggs from a first location of the storage component to a second location of the storage component.

In some embodiments of the kitchen device, the helical component is configured to transfer the raw egg from the storage component to the cracking component of the kitchen device.

In some embodiments of the kitchen device, the cracking component is configured to position the raw egg into an optimal cracking orientation.

In some embodiments of the kitchen device, the cracking component is configured to crack the raw egg and separate a shell of the cracked egg from an egg white and a yolk of the cracked egg.

In some embodiments of the kitchen device, the cooking component comprises a hot plate and a spatula controlled by a multi-axis robotic-controlled arm.

In some embodiments of the kitchen device, the cooking component is configured to cook the egg white and the yolk of the cracked egg using feedback from a vision detection system configured to communicate to the cooking component a position of the egg white and a position of the egg yolk in relation to the spatula.

In some embodiments of the kitchen device, the kitchen device comprises a controller, wherein the controller is configured to receive a request for a cooked egg type; and cook the raw egg in accordance with the cooked egg type requested.

In some embodiments of the kitchen device, the cooked egg type is one of scrambled, over easy, or sunny-side up.

In some embodiments of the kitchen device, the warming component is configured to warm the first cooked egg using recycled warm air from the cooking component.

In some embodiments of the kitchen device, the kitchen device comprises a graphical user interface that is configured to allow a user to input a plurality of process parameters.

In some embodiments of the kitchen device, the graphical user interface comprises a touchscreen.

In some embodiments of the kitchen device, the plurality of process parameters includes one or more of a cooking method, a cooking start time, or a cooking temperature.

In some embodiments of the kitchen device, the kitchen device comprises a closed-loop cleaning system for cleaning a cooking surface of the kitchen device.

In some embodiments of the kitchen device, the closed-loop cleaning system uses ultraviolet light to disinfect the cooking surface of the kitchen device.

In some embodiments, provided is a method of cooking an egg, the method comprising: receiving a raw egg from a storage component of a kitchen device; positioning the raw egg in an optimal cracking position; cracking the raw egg in the optimal cracking position and separating a shell of the cracked egg from an egg white and a yolk of the cracked egg; and cooking the egg white and the yolk of the cracked egg on a temperature-controlled hot plate of the kitchen device.

In some embodiments of the method, the method comprises warming the cooked egg with warm air formed by and recycled from the temperature-controlled hot plate.

In some embodiments of the method, positioning the raw egg in an optimal cracking position comprises constraining the raw egg using two arms configured to mechanically advance toward each other and press against the raw egg.

In some embodiments of the method, cracking the raw egg comprises advancing a sharp object into the raw egg to puncture the shell of the raw egg.

In some embodiments of the method, the method comprises receiving a request for a cooked egg type; and cooking the egg white and the yolk of the cracked egg according to the cooked egg type requested.

In some embodiments of the method, the cooked egg type is one of scrambled, over easy, or sunny-side up.

In some embodiments of the method, the method comprises storing a plurality of raw eggs in the storage component, wherein the storage component is controlled to a temperature of 5 to 40° F.

In some embodiments of the method, the plurality of raw eggs comprises six or twelve eggs.

In some embodiments of the method, the method comprises receiving a raw egg from a storage component of a kitchen device comprises gravitationally transferring the raw egg from the storage component.

In some embodiments of the method, the method comprises inputting, by a user, a plurality of process parameters.

In some embodiments of the method, inputting, by a user, a plurality of process parameters comprises indicating the plurality of process parameters using a touchscreen graphical user interface.

In some embodiments of the method, the plurality of process parameters includes one or more of a cooking method, a cooking start time, or a cooking temperature.

In some embodiments of the method, the method comprises cleaning a cooking surface of the kitchen device.

In some embodiments of the method, cleaning a cooking surface of the kitchen device comprises using ultraviolet light to disinfect the cooking surface.

In some embodiments, provided is a kitchen device for cooking eggs comprising: a storage component; a cracking component; a cooking component; a warming component; and a controller configured to: receive a request for a cooked egg type; in response to receiving the request for the cooked egg type: move a raw egg from the storage component to the cracking component; crack the raw egg such that the cooking component receives the cracked egg; cook the cracked egg in the cooking component; and move the cooked egg to the warming component for warming.

In some embodiments of the kitchen device, the storage component is configured to store a plurality of raw eggs.

In some embodiments of the kitchen device, the storage component is cooled to a temperature of 5 to 40° F.

In some embodiments of the kitchen device, the storage component comprises a tray configured to hold the plurality of raw eggs.

In some embodiments of the kitchen device, the tray comprises a plurality of cups, wherein each cup of the plurality of cups is configured to hold one raw egg of the plurality of raw eggs.

In some embodiments of the kitchen device, the controller is configured to transfer the raw egg from a first cup of the plurality of cups to a second cup of the plurality of cups.

In some embodiments of the kitchen device, a gravitational mechanism is configured to transfer the raw egg from the second cup of the plurality of cups to the cracking component of the kitchen device.

In some embodiments of the kitchen device, the storage component comprises a transfer mechanism comprising a helical coil configured to transfer the raw egg of the plurality of raw eggs from a first location of the storage component to a second location of the storage component.

In some embodiments of the kitchen device, the helical component is configured to transfer the raw egg from the storage component to the cracking component of the kitchen device.

In some embodiments of the kitchen device, the cracking component is configured to position the raw egg into an optimal cracking orientation.

In some embodiments of the kitchen device, the cracking component is configured to crack the raw egg and separate a shell of the cracked egg from an egg white and a yolk of the cracked egg.

In some embodiments of the kitchen device, the cooking component comprises a hot plate and a spatula, and the controller is configured to control the spatula by way of a multi-axis robotic-controlled arm.

In some embodiments of the kitchen device, the cooking component is configured to cook the egg white and the yolk of the cracked egg using feedback from a vision detection system configured to communicate to the cooking component a position of the egg white and a position of the egg yolk in relation to the spatula.

In some embodiments of the kitchen device, the cooked egg type is one of scrambled, over easy, or sunny-side up.

In some embodiments of the kitchen device, the warming component is configured to warm the cooked egg using recycled warm air from the cooking component.

In some embodiments of the kitchen device, the kitchen device comprises a graphical user interface that is configured to allow a user to input a plurality of process parameters.

In some embodiments of the kitchen device, the graphical user interface comprises a touchscreen.

In some embodiments of the kitchen device, the plurality of process parameters includes one or more of a cooking method, a cooking start time, or a cooking temperature.

In some embodiments of the kitchen device, the kitchen device comprises a closed-loop cleaning system for cleaning a cooking surface of the kitchen device.

In some embodiments of the kitchen device, the closed-loop cleaning system uses ultraviolet light to disinfect the cooking surface of the kitchen device.

BRIEF DESCRIPTION OF THE FIGURES

The invention will now be described, by way of example only, with reference to the accompanying drawings, in which.

DETAILED DESCRIPTION

Provided are kitchen devices that can store, prepare, and cook eggs. Kitchen devices provided herein streamline the egg cooking process by minimizing the number of devices/tools needed to store, prepare, and cook the eggs. This streamlining also reduces the amount of cleaning required (in part due to the fewer number of devices/tools needed) and the amount of space storage space dedicated to devices/tools needed to cook eggs (fewer devices/tools translates to less countertop, drawer, and cabinet space occupied).

Kitchen devices provided herein include four components: a storage component, a cracking component, a cooking component, and a warming component. Each component is dedicated to a specific function of the process. For example, a storage component stores the raw eggs. A user can insert a plurality of raw eggs into the storage component for storage until preparation and cooking is desired. Accordingly, the storage component is temperature controlled.

A cracking component receives the raw eggs from the storage component and prepares the raw eggs for cooking. For example, the cracking component can crack the egg(s) and separate the eggshell from the albumen (i.e., egg white) and vitellus (i.e., egg yolk). The cracking component might include a receptacle for collecting waste such as the eggshells. In some embodiments, the cracking component might also separate the egg white from the egg yolk. For example, this separation might be chosen for a user who desires their cooked food product to contain egg white only, and no egg yolk (e.g., for a user desiring a lower-cholesterol option). Thus, the receptacle might also collect egg yolk in some embodiments.

A cooking component receives a cracked egg from the cracking component and cooks the eggs. In some embodiments, kitchen devices provided herein can cook the eggs using any of various methods. A user can select which of the various methods is used to cook his or her eggs. For example, the cooking component may receive the egg(s) and cook them over easy according to a user input selecting over easy as the cooking method. Other cooking methods might include scrambled or sunny-side up, for example.

In some embodiments, kitchen devices provided herein include a warming component for warming the cooked eggs. After the egg(s) are cooked in the cooking component, they can be held and warmed in the warming component until the user retrieves them from the device.

Other features of kitchen devices provided herein can include a graphical user interface, a self-cleaning feature, and carious user-controlled process parameters.

Described below are each component of the kitchen devices provided herein, including the storage component, the cracking component, the cooking component, the warming component, cleaning processes, graphical user interfaces, and methods of cooking eggs using the kitchen devices provided herein.

Egg Cooking Kitchen Devices

Figure 1A:
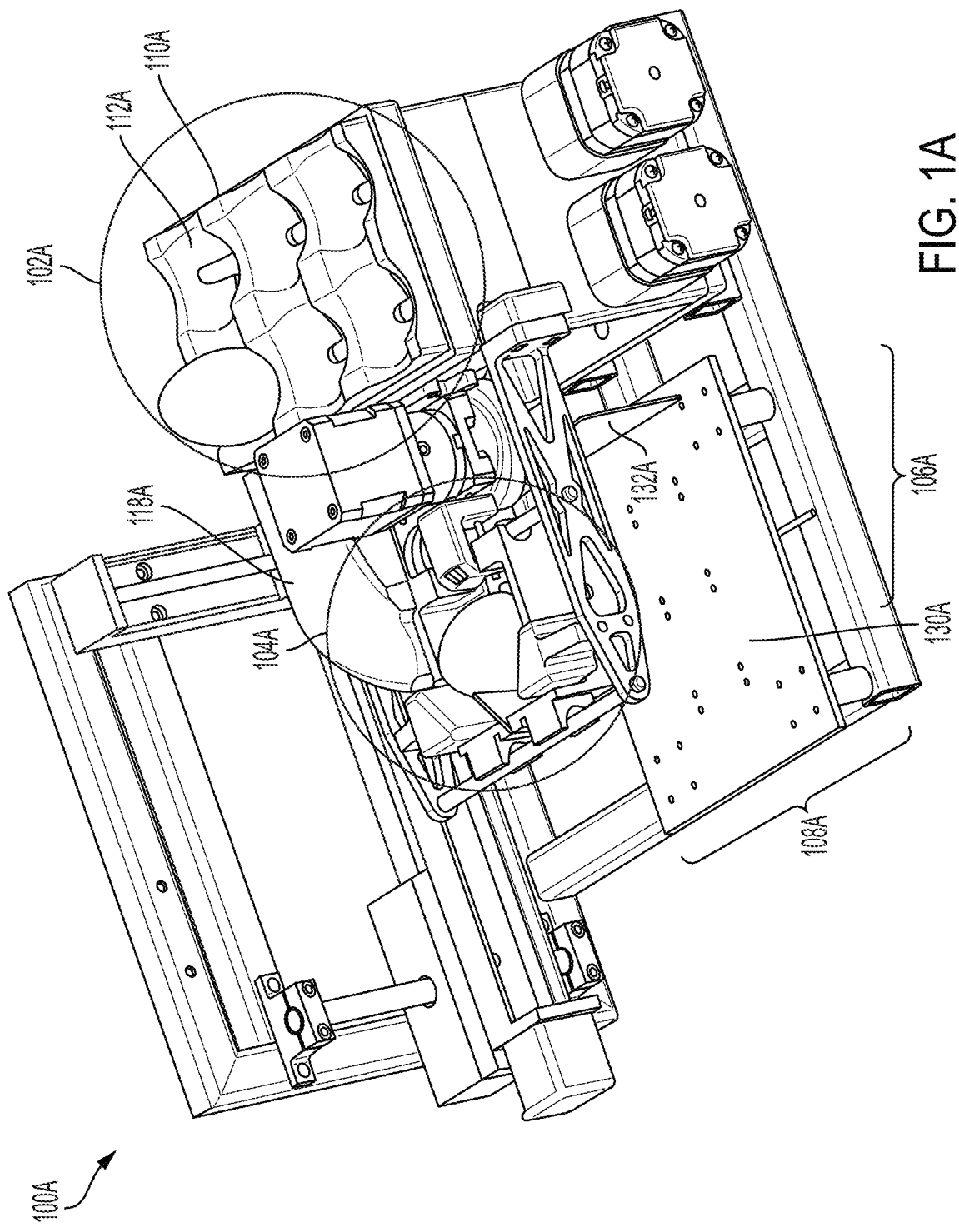
FIG. 1A shows a kitchen device for cooking eggs, according to some embodiments.

FIG. 1A shows a kitchen device 100A according to some embodiments provided herein. As shown in the Figure, kitchen device 100A includes a storage component 102A, a cracking component 104A, a cooking component 106A, and a warming component 108A.

In some embodiments, storage component 102A is configured to receive and store one or more eggs on tray 110A. In some embodiments, tray 110A includes a multi-dimensional array of one or more cup 112A. In some embodiments, each cup 112A is configured to receive and hold a single egg. In some embodiments, storage component 102A comprises a helical coil configured to hold one or more eggs. A storage component comprising a helical coil is described in more detail with respect to FIG. 2B.

Storage component 102A may include temperature control for optimal storage of the eggs. For example, the raw eggs in storage component 102A may be refrigerated. The storage component 102A might also include an insertion door with an open/closed sensor and monitoring feature. This can help maintain the temperature within the storage component, while also allowing for a user to insert eggs into the storage component.

Other features of the storage component can include a transfer mechanism. For example, the transfer mechanism may be configured to transfer a raw egg from a first cup 112A to a second cup 112A. Storage component 102A may also include features such as sensors configured to sense and indicate when a raw egg is present in the tray 110A and/or which of the cups 112A of the tray 110A comprise a raw egg at any given moment, and an output mechanism 118A configured to transfer a raw egg from the second cup 112A to the cracking component 103A. Each of these features of the storage component 102A is described in more detail with respect to the storage component 200A, 200B, and 200C of FIGS. 2A, 2B, and 2C, respectively.

Cracking component 104A is configured to receive a raw egg from storage component 102A, orient the egg into an optimal cracking position, and crack the raw egg. A mechanism for receiving the raw egg from the storage component 102A can include output mechanism 118A of the storage component 102A. For example, transporting an egg from storage component 102A to cracking component 104A may include a ramp. Other suitable transfer mechanisms may include a belt, a paddle advancing system, or a helical coil (e.g., helical coil 280 of FIG. 2B, which is also configured to advance an egg from one position of the storage component to another position of the storage component).

Cracking component 104A is configured to prepare one or more eggs prior to cooking. For example, cracking component 104A might include a mechanism for cracking the one or more eggs and separate the cracked shell from the egg white and egg yolk of the cracked egg. A cracking mechanism might be configured to crack multiple eggs at once, or it might be configured to crack one egg at a time. In some embodiments, an egg cracking mechanism might be configured to crack multiple eggs by cracking each egg of the multiple eggs serially.

Other features of cracking component 104A can include an egg positioning device and a trash receptacle to collect waste byproduct (e.g., cracked egg shells). Each of these features of the cracking component 104A is described in more detail in FIGS. 3A-3C.

Cooking component 106A is configured to cook one or more cracked eggs. One or more cracked eggs are received by cooking component 106A from cracking component 104A. At cooking component 106A, the one or more cracked egg may be cooked any one of a number of methods. For example, the one or more cracked eggs may be scrambled, cooked over easy, cooked sunny side up, etc.

Cooking component 106A may include a spatula 132A and a hot plate 130A for cooking the one or more eggs. In some embodiments, cooking component 106A may be configured to cook the one or more eggs according to a user input identifying which one of a plurality of cooking methods the user prefers. In some embodiments, a spatula may be configured to perform an action specific to the cooking method selected by the user. The action performed by spatula 132A may be different for each cooking method. In some embodiments, a controller is configured to control the type of cooking. For example, the controller may use a closed loop system to control the type of cooking of the egg(s). The closed loop system may include a feedback loop that includes a vision system or a system that otherwise indicates the position of the tooling and the egg(s). The feedback loop may have the capability of determining how "cooked" the egg(s) is using an infrared heat mechanism or a color recognition algorithm, for example.

Figure 4A:
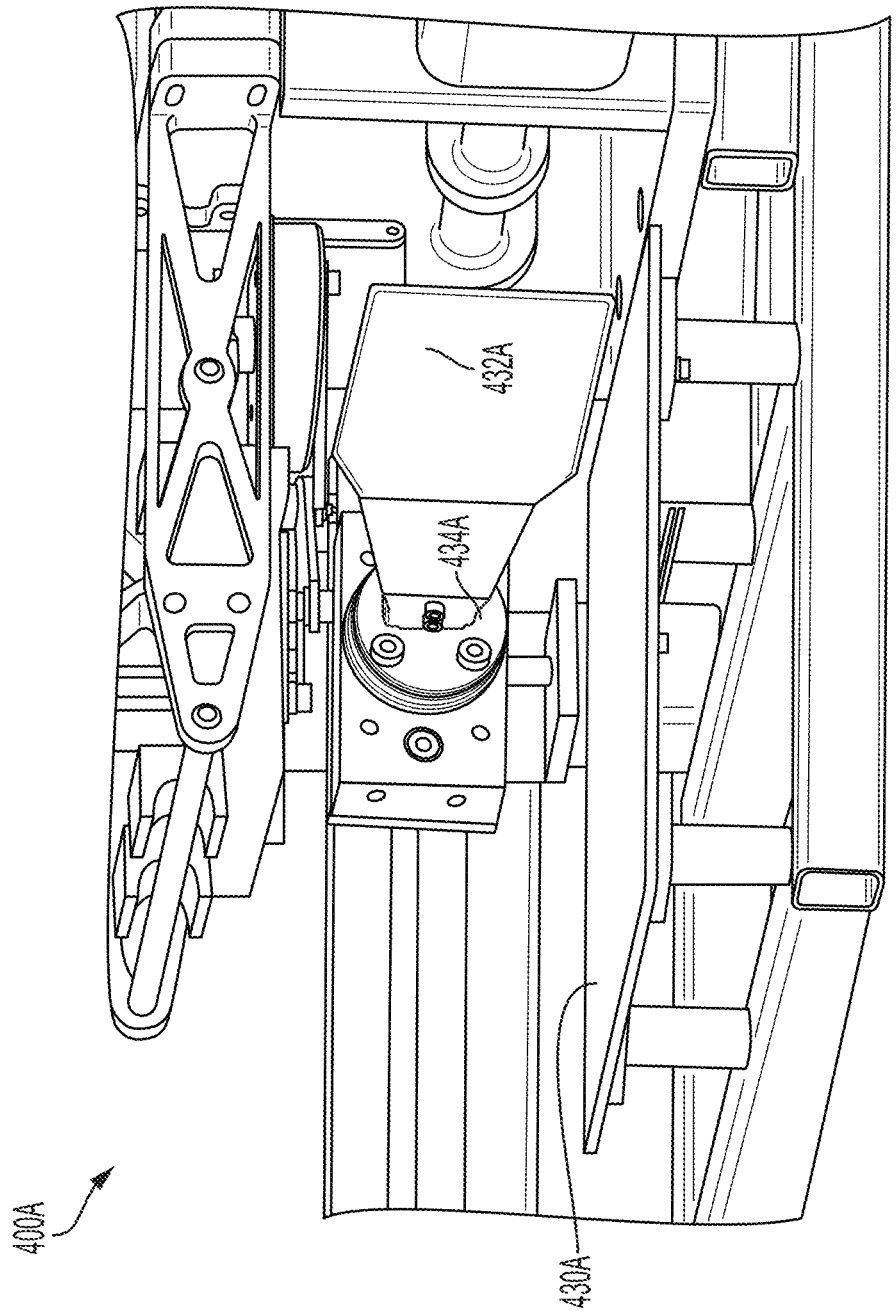
FIG. 4A shows a cooking component of a kitchen device, according to some embodiments.
Figure 4B:
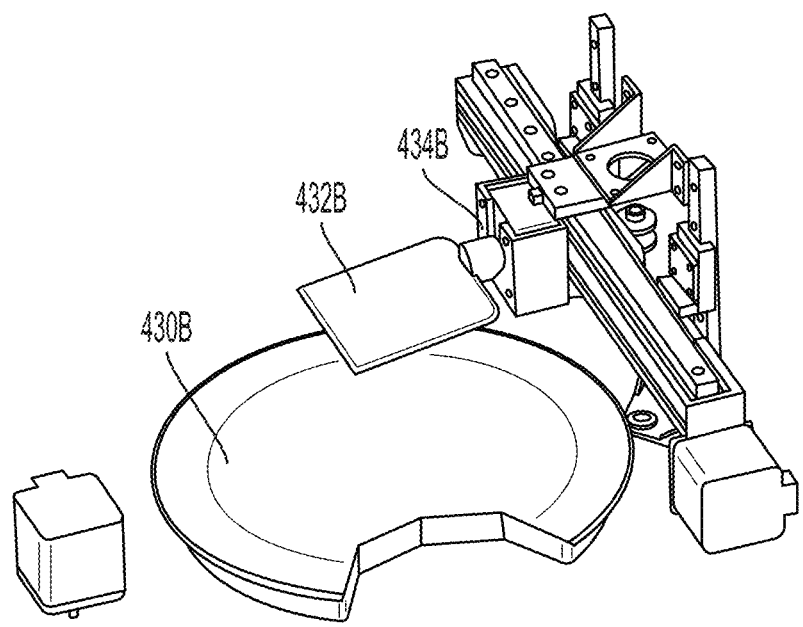
FIG. 4B shows a cooking component of a kitchen device, according to some embodiments.
Figure 4C:
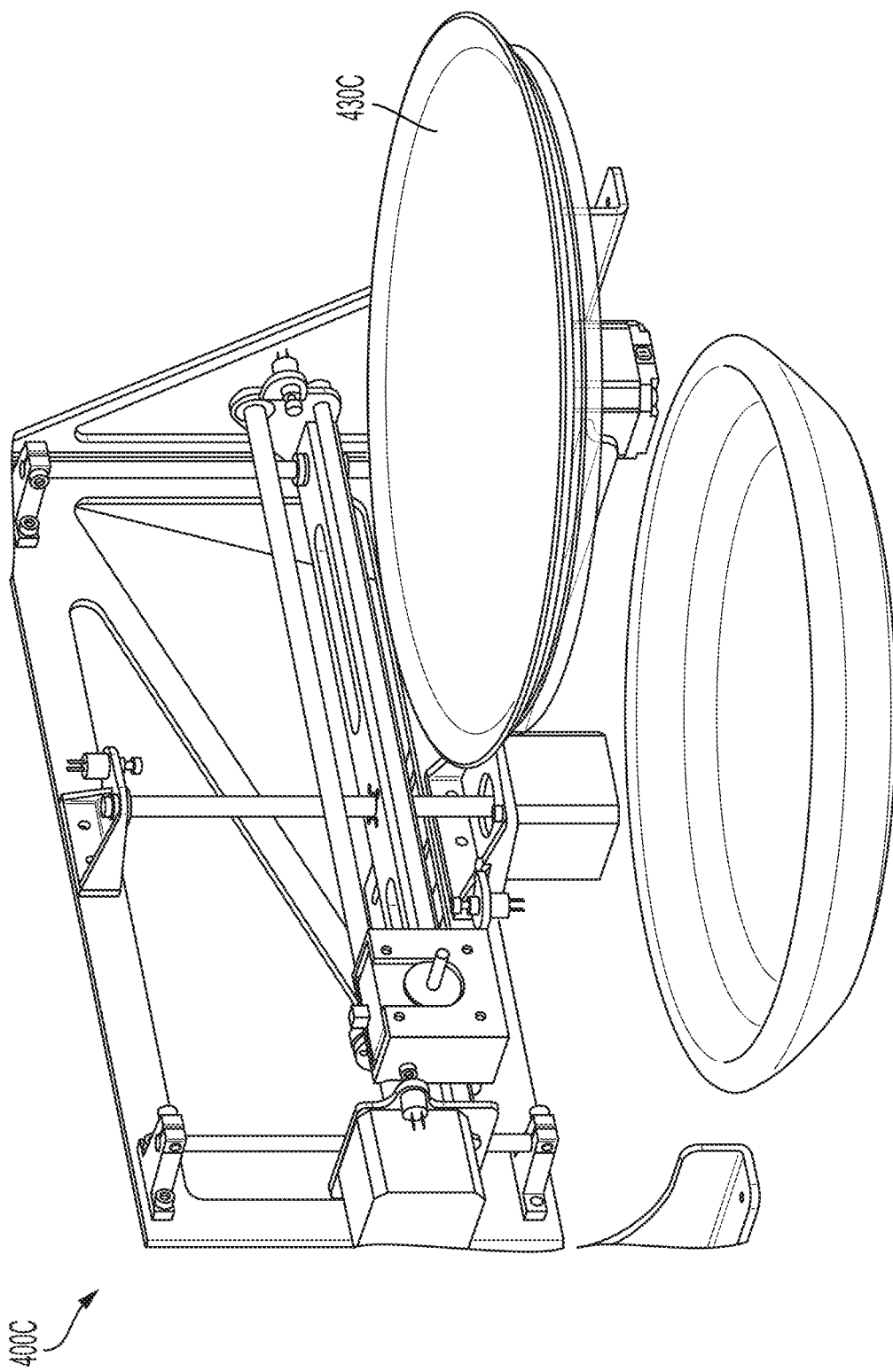
FIG. 4C shows a cooking component of a kitchen device comprising a rotating hot plate, according to some embodiments.

Cooking component 106A is described in more detail in FIGS. 4A-4C.

Warming component 108A is configured to receive the cooked eggs from cooking component 106A and warm the cooked eggs. The cooked egg(s) may be received from cooking component 106A for warming. A user can also receive the cooked eggs from the kitchen device at the warming component 108A. In some embodiments, warming component 108A recycles warm air produced by cooking component 106A to warm the cooked eggs.

Figure 5:
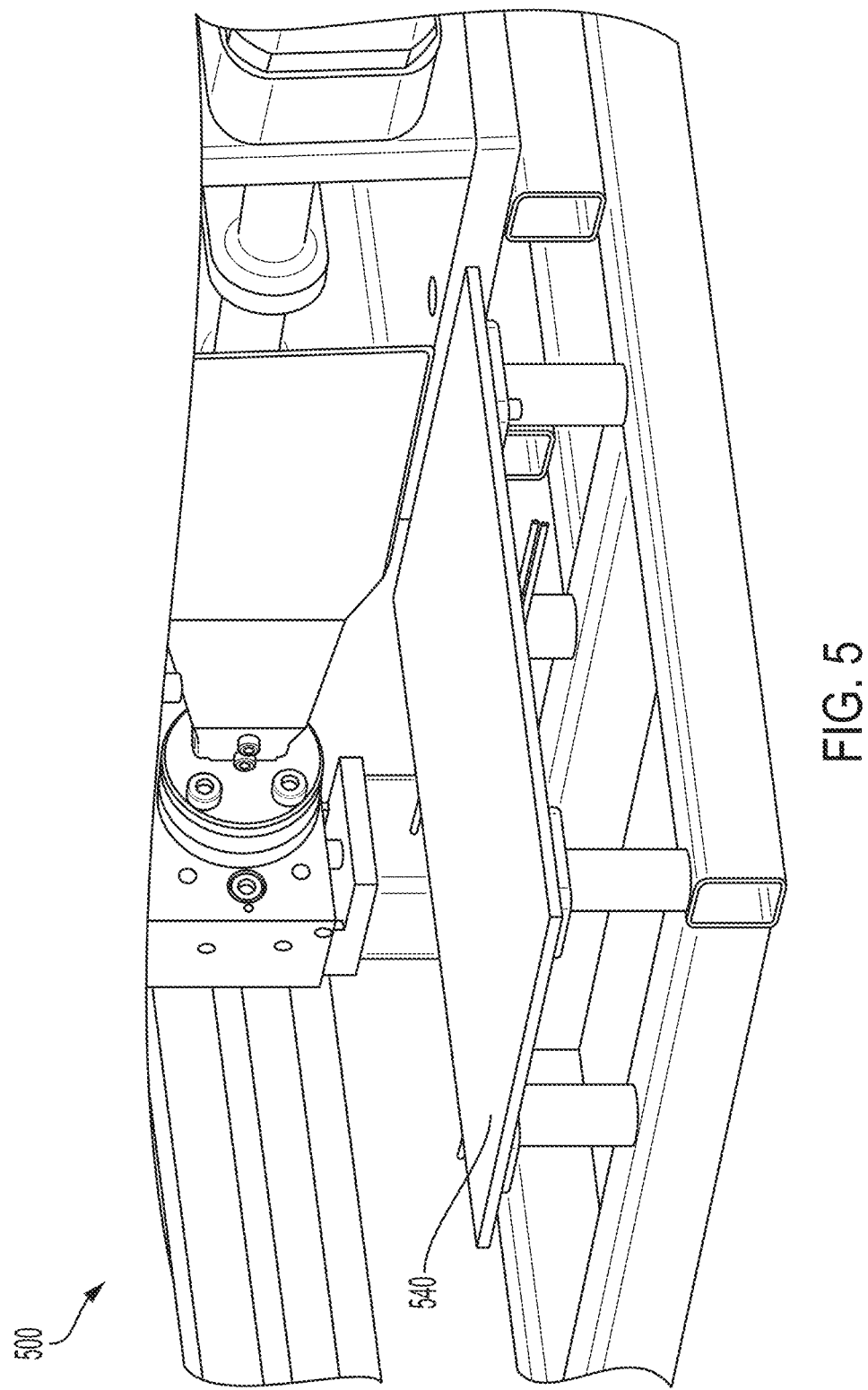
FIG. 5 shows a warming component of a kitchen device, according to some embodiments.

The warming component 108A is described in more detail in FIG. 5.

Figure 1B:
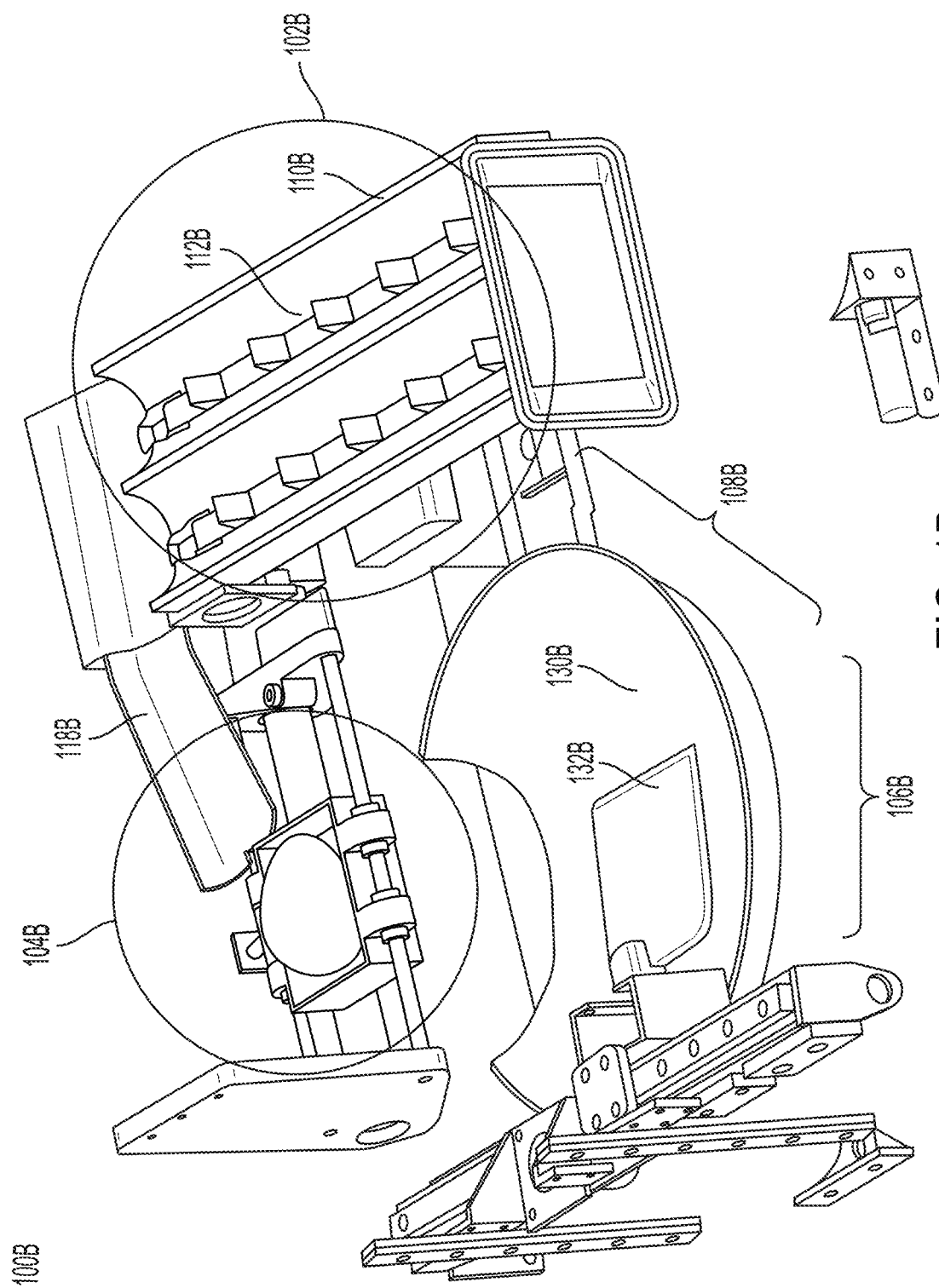
FIG. 1B shows a kitchen device for cooking eggs, according to some embodiments.

FIG. 1B shows a kitchen device 100B according to some embodiments provided herein. As shown in the Figure, kitchen device 100B includes a storage component 102B, a cracking component 104B, a cooking component 106B, and a warming component 108B.

Storage component 102B can include any features described with respect to storage component 102A. For example, storage component 102B can include a tray 110B and a plurality of cups 112B. Each cup 112B of tray 110B can be separated by a tooth attached to a conveyer belt. This feature is described in more detail with respect to FIG. 2C.

Cracking component 104B can include any features described with respect to cracking component 104A. Cracking component 104B receives an egg to be cracked from storage component 102B by way of output mechanism 118B.

Cooking component 106B can include any features described with respect to cooking component 106A, including hot plate 130B and spatula 132B.

Warming component 108B can include any features described with respect to warming component 108A.

Storage Component

Figure 2A:
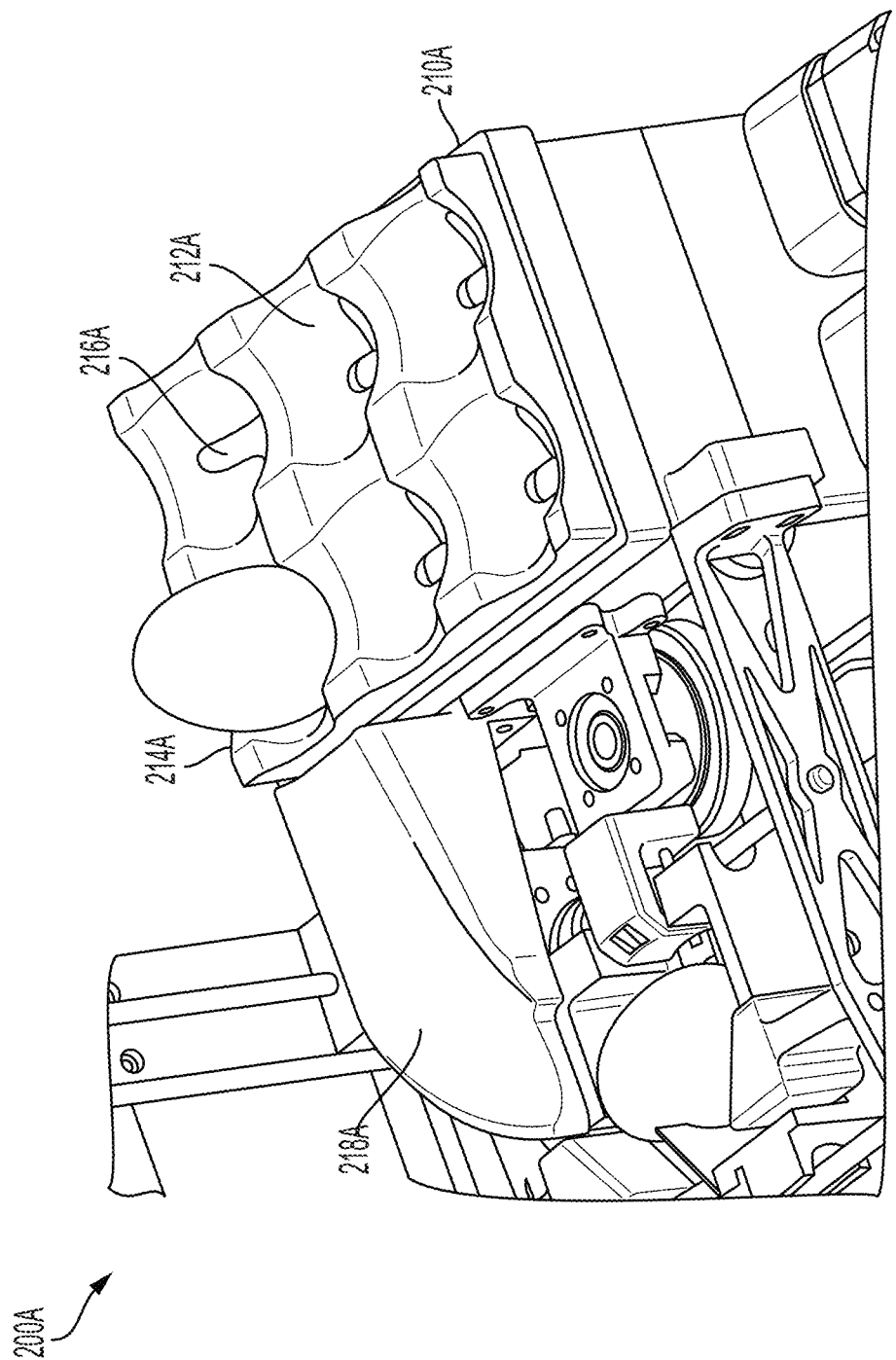
FIG. 2A shows a storage component of a kitchen device, according to some embodiments.

FIG. 2A shows a storage component 200A of a kitchen device, according to some embodiments. As shown, storage component 200A includes tray 210A that comprises a multi-dimensional array of a plurality of cups 212A. Each cup 212A is configured to hold a single egg in a particular orientation. Cup 214A, also referred to herein as a launching cup, is shown in FIG. 2A holding an egg. In some embodiments, tray 210A may be fixed in place. Tray 210A may also be removable. For example, tray 210A may be removable from storage component 200A by way of an access door. A removable tray 210A can allow a user to remove the tray 210A, place a plurality of raw eggs into the tray 210A, and place tray 210A back into storage component 200A of the kitchen device. In some embodiments, tray 210A is configured to receive the eggs in a certain orientation for processing. For example, successful preparation and cooking of the eggs might require that the eggs are received by the device 200A in a certain orientation.

As shown in FIG. 2A, tray 210A comprises six cups 212A. However, tray 210A may comprise more than or less than six cups 212A. For example, tray 210A may comprise 2, 3, 6, 8, 9, 10, 12, 15, 18, or 23 cups 212A. Additionally, tray 210A is shown comprising a 2×3 array of cups 212A. However, this array configuration may also be any of 1×6, 2×3, 3×2, or 6×1 for a tray 210A comprising six cups. Other configurations can include 1×12, 2×6, 3×3, 3×3, 6×2, or 12×1 for a tray 210A comprising 12 cups. Other cup array configurations may also be utilized.

In some embodiments, storage component 200A may be temperature-controlled. For example, storage component may include a cooling system or a refrigeration system configured to keep the raw eggs cool until they are ready to be cooked. For example, storage component 200A may be cooled to a temperature of 0 to 30° F. In some embodiments, storage component 200A may be cooled to a temperature of less than 30° F., less than 35° F., less than 30° F., less than 25° F., less than 20° F., less than 15° F., less than 10° F., or less than 5° F. In some embodiments, storage component 200A may be cooled to a temperature of greater than 5° F., greater than 10° F., greater than 15° F., greater than 20° F., greater than 25° F., greater than 30° F., or greater than 35° F. In some embodiments, storage component 200A may be cooled to a temperature of 5 to 30° F.

Each cup 212A may be configured to hold and store a single raw egg in a certain orientation. Geometrically, eggs are ovoids that comprise a single axis of symmetry. Thus, the ovoid shape of an egg has two ends—a wide end and a narrow end. As shown in the Figure, the cups 212A of tray 210A are each configured to hold an egg in an orientation such that the narrow end is upright, and the wide end is downward facing in the cup. In some embodiments, cups 212A may be configured to hold an egg with either end (narrow or wide) in an upright position. In some embodiments, cups 212A may be configured to hold a raw egg on its side.

In some embodiments, the kitchen device may be configured to track the number of eggs present in tray 210A. For example, if twelve eggs are originally placed into tray 210A, and two are processed such that only ten eggs remain, the kitchen device may be configured to account for each egg in tray 210A at any given time and communicate to a user the number of eggs remaining/present. And thus, the user can determine when he or she may need to replenish the egg supply in tray 210A. Suitable examples of sensors can include pressure sensors, laser sensors, etc. A display may be included on an exterior surface of the kitchen device displaying the number of eggs present in tray 210A, such as a graphical user interface.

Tray 210A comprises a mechanism configured to transfer an egg from one cup to another cup. In some embodiments, this transfer mechanism may be configured to move an egg from a non-launching cup to launching cup 214A. In some embodiments, an egg may need to progress through a plurality of cups one by one until it reaches launching cup 214A.

The transfer mechanism shown in FIG. 2A includes a plurality of ejectors 216A. Each cup 212A comprises a single ejector 216A. The ejector 216A is configured to raise up from a base of a first cup 212A and into an internal space of first cup 212A to push the egg in the first cup 212A up and over the edge of the first cup 212A into an adjacent second cup 212A. Each cup 212A may include a hole in the base to allow the ejector 216A to retreat from the internal space of the cup 212A when not in use, and to advance into the internal space of the cup 212A when the egg in cup 212A is to be transferred to an adjacent cup 212A.

In some embodiments, each ejector 216A is positioned such that it is configured to transfer an egg within the cup 212A associated with that ejector 216A to a predetermined adjacent second cup 212A. For example, tray 210A may comprise six cups 212A, label A, B, C, D, E, and F. A cup 212A may comprise launching cup 214A. To pass from storage component 200A to a cooking component of the kitchen device (e.g., cooking component 300A, 300B, or 300C of FIG. 3A, 3B, or 3C, respectively), an egg in cup D might not be transferred directly from cup D to cup A. Instead, a series of ejectors 216A, one in each cup 212A, may be configured to transfer the egg from cup D to cup A in a stepwise manner. Thus, an egg in cup D may need to progress to cup A by first passing though cups C and B.

As described above, one cup 212A comprises launching cup 214A. Launching cup 214A is located adjacent to an outlet mechanism 218A. Outlet mechanism 218A is configured to receive an egg from the storage component 200A and transfer it to a cracking component (e.g., cracking component 300A, 300B, or 300C of FIG. 3A, 3B, or 3C, respectively) using gravitational force or mechanical means. In some embodiments, outlet 218A may comprise a ramp allowing an egg to slide from the storage component 200A, down the ramp, and into a cracking component of the kitchen appliance. Other suitable outlet mechanisms can include a belt, a paddle advancing system, or a helical coil.

Additionally, kitchen devices described herein are configured to process and cook difference types of eggs. For example, a kitchen device provided herein may be configured to process eggs from different animals (i.e., animals other than chickens). In some embodiments, a kitchen device provided herein may be configured to process chicken eggs of different sizes.

Figure 2B:
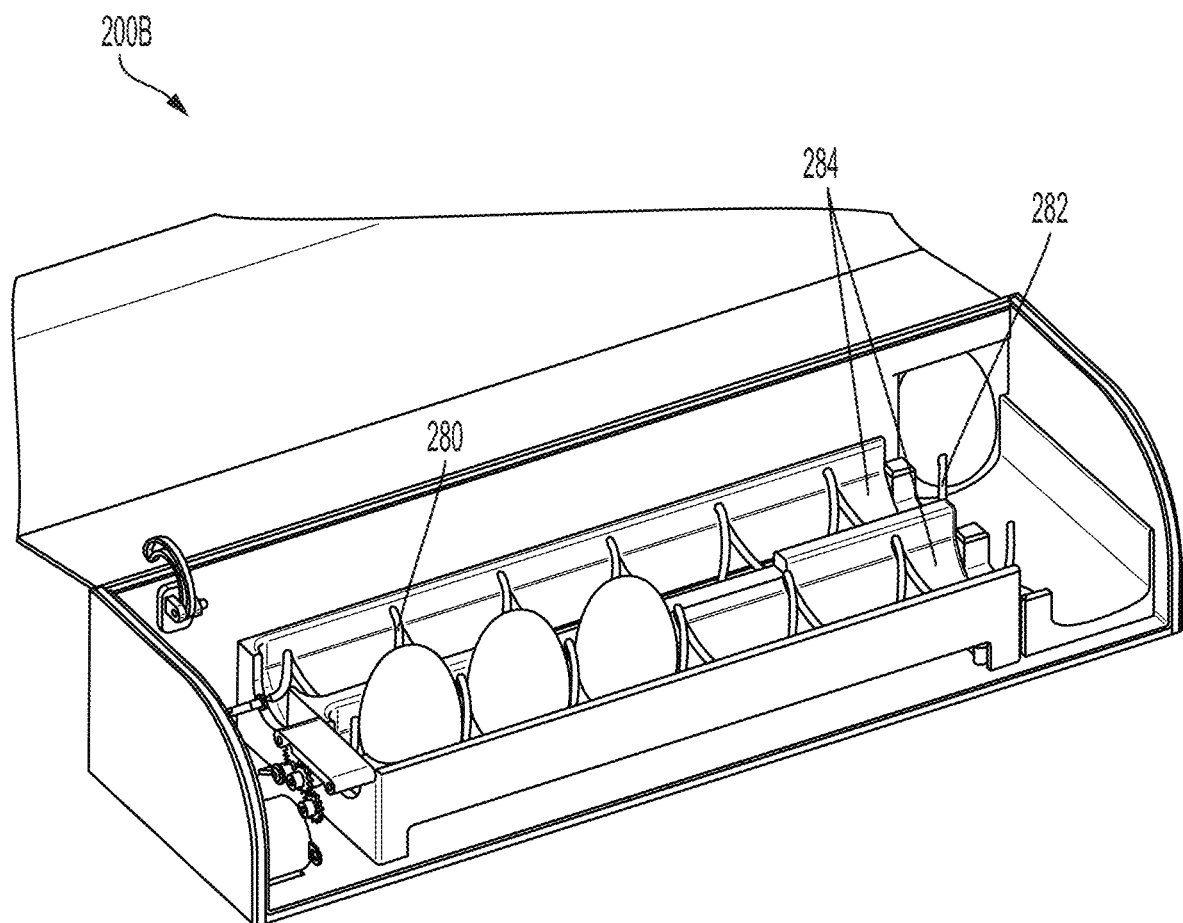
FIG. 2B shows a storage component of a kitchen device comprising a helical coil mechanism, according to some embodiments.

FIG. 2B shows storage component 200B comprising a transfer mechanism having a helical coil 280. Helical coil 280 is configured to advance an egg from one position in storage component 200B to a second position in storage component 200B. In some embodiments, helical coil 280 may be configured to advance an egg towards launching position 284. As shown in the Figure, storage component 200B comprises two launching positions 284. An egg in launching position 284 is the next egg to be transferred to a cracking component (e.g., cracking component 300A, 300B, or 300C of FIG. 3A, 3B, or 3C). In some embodiments, an end 282 of helical coil 280 may be configured to transfer an egg from storage component 200B to a cracking component (e.g., cracking component 300 of FIG. 3). Storage component 200B of FIG. 2B may also include any features described above with reference to storage component 200A of FIG. 2A.

Figure 2C:
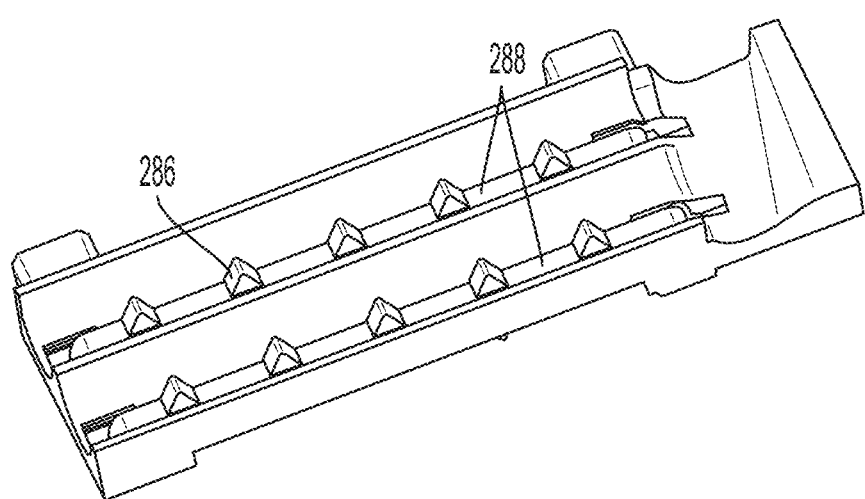
FIG. 2C shows a storage component of a kitchen device comprising a conveyer belt mechanism, according to some embodiments.

FIG. 2C shows a storage component 200C according to some embodiments, which can include any features described with respect to storage component 200A of FIG. 2A and/or storage component 200B of FIG. 2B. As shown, storage component 200C can include a plurality of teeth 286 attached to a conveyor belt 288. The space between two adjacent teeth can accommodate a single egg. As the conveyor belt 288 moves along a length of the storage component 200C, any eggs that are held between two teeth 286 move as well.

Cracking Component

Figure 3A:
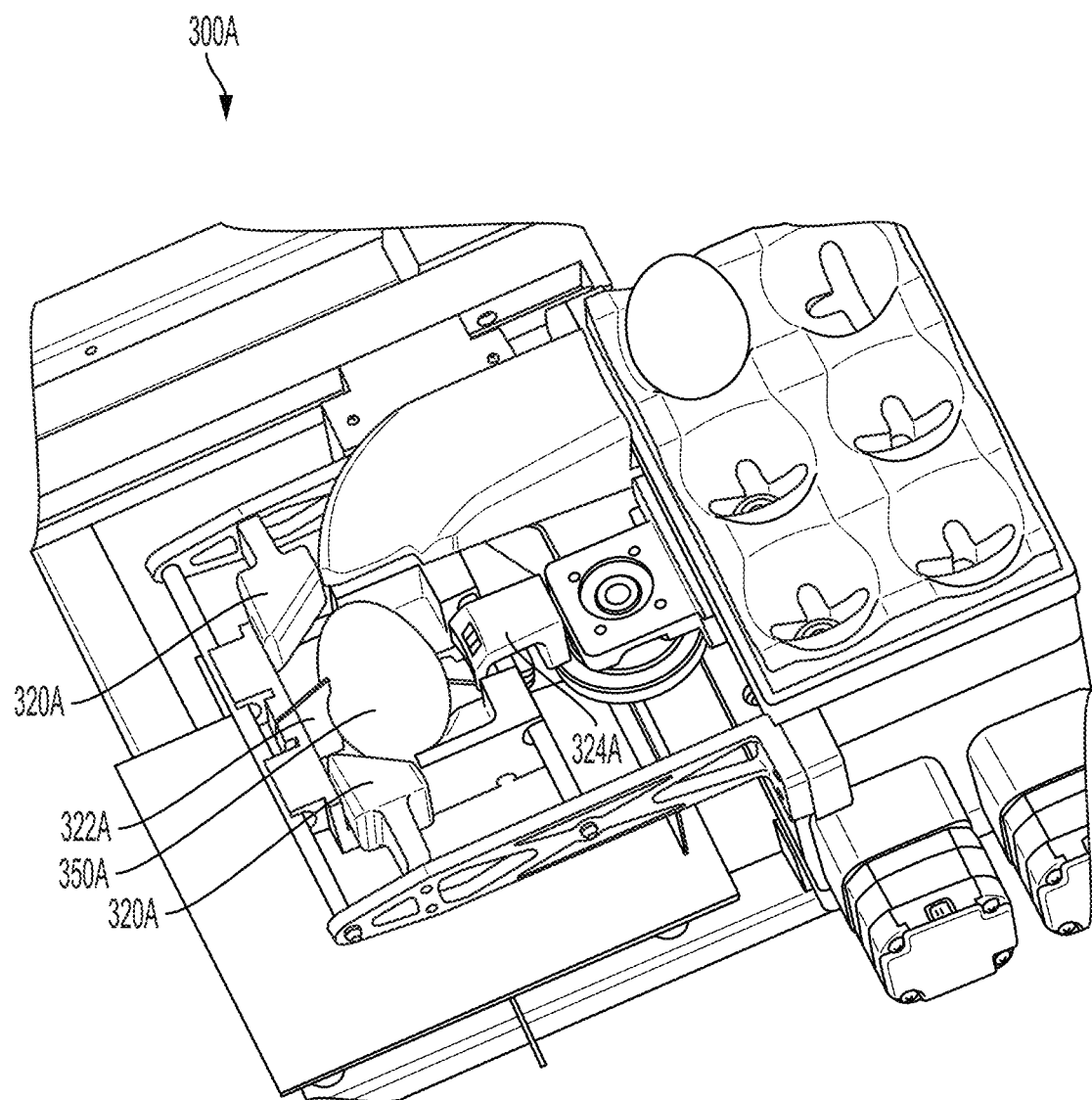
FIG. 3A shows a cracking component of a kitchen device, according to some embodiments.

FIG. 3A shows a cracking component 300A of a kitchen device, according to some embodiments. Cracking component 300A includes an egg cracking mechanism that includes an egg positioning device, a mechanical constraining pusher 324A, and a cracker 322A. Specifically, the egg positioning device incudes two arms 320A. Once egg 350A enters cracking component 300A, it is positioned into the egg positioning device. Arms 320A of the egg positioning device advance towards egg 350A to properly orient and to help hold the egg 350A in place. Mechanical constraining pusher 324A is also configured to advance toward egg 350A to help hold egg 350A in place for cracking.

As shown in FIG. 3A, egg 350A is positioned such that its axis of symmetry runs parallel to a direction in which the cracker 322A extends. Specifically, cracker 322A is configured to advance towards egg 350A in a direction that is parallel to an axis of symmetry of egg 350A. Thus, arms 320A are configured to gently push against a location of egg 350A that is adjacent to one of the two ends of egg 350A (i.e., the narrow end or the wide end) and mechanical constraining pusher 324A is configured to gently push against a side of the egg. Cracker 322A is configured to advance toward egg 350A and crack egg 350A at a location along a side of egg 350A that is opposite the side held in place by mechanical constraining pusher 324A.

As described, cracker 322A is configured to mechanically advance towards egg 350A and force the shell of egg 350A to break open, exposing the egg white and yolk of egg 350A. In some embodiments, cracker 322A may comprise a blade or other sharp object that can pierce the shell of egg 350A. For example, cracker 322A may comprise a blade or awl configured to pierce and crack the shell of egg 350A. In some embodiments, cracker 322A may be configured to spread open the cracked shell, allowing the egg white and/or yolk of egg 350A to separate and/or fall from the shell of egg 350A. In some embodiments, the egg positioning device is configured to hold and retain the cracked, or broken, shell, while allowing the egg white and/or yolk to separate from the shell. In some embodiments, cracker 322A may comprise a sharp object having at least two components that are configured to separate to retain the cracked shell and allow the egg white and yolk to transfer to the cooking component (e.g., cooking component 400A, 400B, or 400C of FIG. 4A, 4B, or 4C, respectively). For example, the two components of the sharp object may spread apart in a direction that is perpendicular to the advancement direction (i.e., the direction in which cracker 322A advances toward egg 350A) to open the cracked shell and achieve a cracked and separated (i.e., egg white and yolk separated from crack shell) egg 350A. The two components of the sharp object of cracker 322A may be configured such that cracker 322A is configured to advance towards and pierce egg 350A when the two components are flush together, and spread apart after cracker 322A has cracked egg 350A to separate parts of the cracked egg 350A. In some embodiments, the cracking component 300A is configured to crack egg 350A and allow the egg white and/or yolk of the cracked egg to fall from the cracked egg shell down to a cooking component (e.g., the cooking component 400A, 400B, or 400C of FIG. 4A, 4B, or 4C, respectively). In some embodiments, the cracking component 300A is configured to crack egg 350A and allow the egg white and/or yolk of the cracked egg to fall into a holder that is then configured to transfer the egg white and/or yolk to the cooking component (e.g., the cooking component 400 of FIG. 4).

In some embodiments, cracker 322A may include a closed loop control system configured to determine and terminate the end condition of the egg white and/or egg yolk removal on its own by means of a vision-based system algorithm. For example, the closed loop control system may be a proportional-integral-derivative based control system. Additionally, cracking component 300A may be configured to move back and forth (e.g., in a forward and reverse motion) to shake out the contents of the egg (i.e., egg white and egg yolk) to effectively separate the egg white and/or yolk from the egg shell. This back and forth motion may also be achieved using a closed loop control system.

In some embodiments, the kitchen device includes a monitoring system that can indicate situations in which the operation of the cracking component 300A is amiss. For example, the monitoring system may be able to detect that there is no egg in the egg positioning device. In this scenario, perhaps the transfer of the egg from the storage component (e.g., the storage component 200A, 200B, or 200C of FIG. 2A, 2B, or 2C, respectively) to the cracking component 300A failed. In some embodiments, the monitoring system may detect that there was a bad crack. For example, egg 350A may not have cracked enough to allow the egg white and yolk to release from egg 350A, or the shell of egg 350A may have cracked too much, allowing some of the shell to transfer with the egg white and yolk to the cooking component. In some embodiments, the monitoring system may detect a "bad" egg. For example, the monitoring system may determine that an egg is "bad" if it is not the appropriate shape or the appropriate size. In some embodiments, the monitoring device may detect if an egg 350A is not in the proper orientation for optical cracking. In some embodiments, a vision-based monitoring system may be configured to identify egg size, an egg that has been cracked too much or not enough, whether egg yolk and egg white separated from the egg shell properly, a "bad" egg, and/or an egg that is not properly oriented for optimal cracking.

In some embodiments, cracking component 300A includes a trash receptacle. For example, the shell of a cracked egg 350A may be collected in a trash receptacle to be removed from the kitchen device. In some embodiments, the shell of the cracked egg 350A may be the only material collected by a trash receptacle. In some embodiments, one of the egg white or yolk may be collected by a trash receptacle for removal from the kitchen device. In some embodiments, a user may manually remove the trash receptacle from the kitchen appliance, empty it, and replace it back in to the kitchen device. For example, the trash receptacle may comprise a removable and re-insertable drawer. In some embodiments, the trash receptacle may be ejected from the kitchen device in response to a user input direction the ejection of the trash receptacle. In some embodiments, the trash receptacle may be dishwasher safe.

In some embodiments, the cracked shell of egg 350A (and any other material determined as trash) may be transferred to the trash receptacle using an ejector ramp. The ejector ramp may be configured to slide, push, or otherwise direct the cracked shell of egg 350A into the trash receptacle using gravity and/or mechanical force. For example, the ejector ramp may be configured to receive and direct the cracked shell into the trash receptacle via gravity. In some embodiments, the cracked shell of egg 350A may be configured to fall from the mechanical constraining pusher to a surface, and the ejector ramp may be configured to slide or push the cracked shell from the surface into the trash receptacle. In some embodiments, the cracked shell of an egg 350A may be configured to fall from the mechanical constraining pusher to a surface of a hot plate (e.g., hot plate 430A or 430B or 430C of FIG. 4A, 4B, or 4C, respectively), and a spatula (e.g., spatula 432A or 432B of FIG. 4A or 4B, respectively) may be configured to push the cracked shell into the trash receptacle.

Figure 3B:
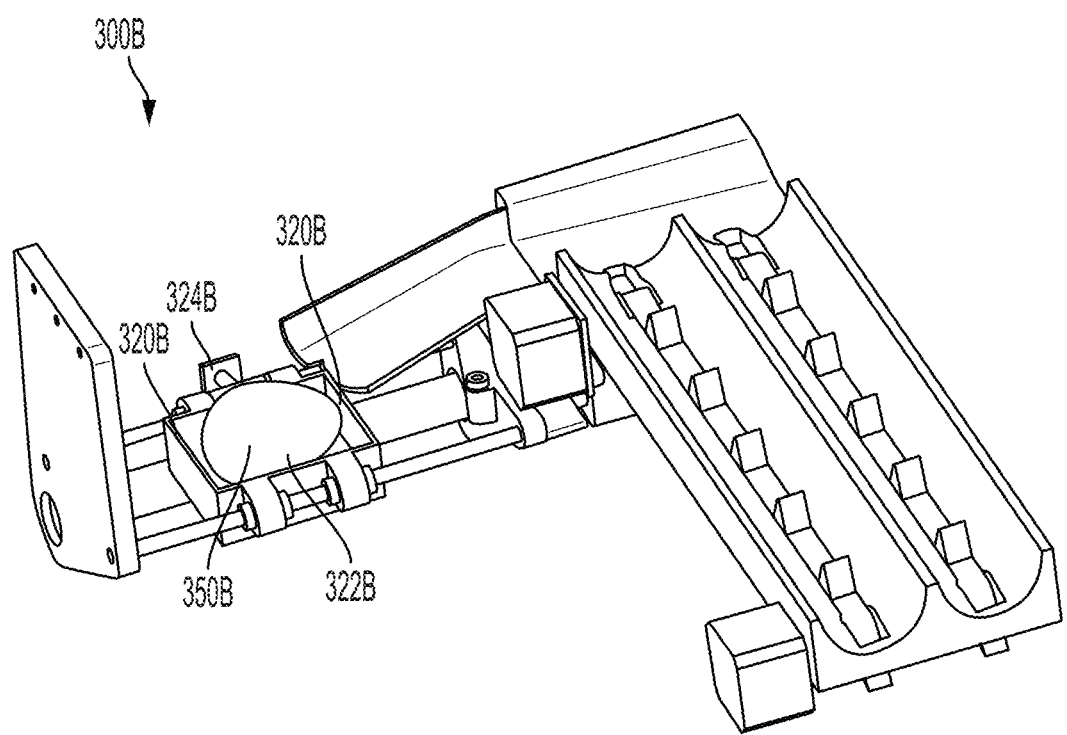
FIG. 3B shows a cracking component of a kitchen device, according to some embodiments.

FIG. 3B shows a cracking component 300B a kitchen device, according to some embodiments. Cracking component 300B can include any features of cracking component 300A described above. Specifically, FIG. 3B shows an egg 350B ready to be cracked within the cracking component 300B that comprises arms 320B, cracker 322B, and mechanical constraining pusher 324B. Each of these components can operate in a similar manner to that which is described with respect to cracking component 300A of FIG. 3A.

Figure 3C:
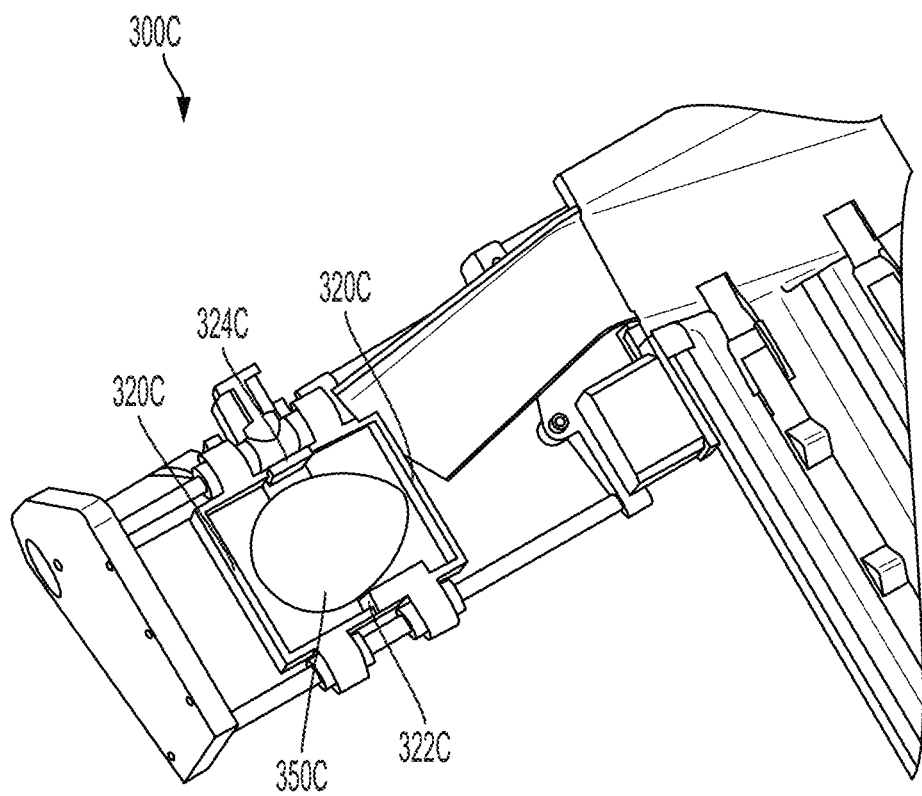
FIG. 3C shows a shows a cracking component of a kitchen device, according to some embodiments.

FIG. 3C shows a shows a cracking component 300C of a kitchen device, according to some embodiments. Cracking component 300C can include any features of cracking components 300A or 300B, described above. As shown, FIG. 3C shows an egg 350C ready to be cracked within the cracking component 300C that comprises arms 320C, cracker 322C, and mechanical constraining pusher 324C. Each of these components can operate in a similar manner to that which is described with respect to cracking component 300A of FIG. 3A and/or cracking component 300B of FIG. 3B.

Cooking Component

FIG. 4A shows a cooking component 400A of a kitchen device. Specifically, cooking component 400A includes a hot plate 430A and a spatula 432A. Spatula 432A is coupled to a control device 434A that is configured to control the motion of spatula 432.

Control device 434A may include a multi-axis robotic-controlled arm or a gantry to move spatula 432A in various directions. For example, the motion of spatula 432A may vary with different types of cooking methods (e.g., scrambled, over easy, sunny side up). Control device is configured to mechanically direct the movement of spatula 432A. For example, control device 434A may be configured to rotate spatula 432A, such that spatula 432A rotates along an axis that runs along a length of the handle of the spatula. Control device 434A may also be configured to move spatula 432A up and down, in a direction perpendicular to a plane of the hot plate 430A surface, such that when spatula is in a down position, a blade of spatula 432A is in contact with hot plate 430A. Control device 434A may be configured to move spatula 432A into any position located between a down-most position (i.e., spatula 432A in contact with hot plate 430A) and an up-most position. Control device 434A may also be configured to move spatula 432A in a side-by-side motion, in a direction parallel to a plane of the hot plate 430A surface. In some embodiments, this side-by-side motion of spatula 432A may be used to push cracked shells of a cracked egg into a trash receptacle. In some embodiments, spatula 432A may be removable from control device 434A. For example, a user may remove spatula 432A from control device 434A to clean spatula 432A. In some embodiments, spatula 432A may be dishwasher safe. Additionally, although cooking component 400A of FIG. 4 includes spatula 432A, other suitable tools or devices may be used to manipulate the egg to achieve the desired cooked egg product.

Hot plate 430A includes a cooking surface. In some embodiments, the cooking surface may be completely flat and horizontal (i.e., as shown in FIG. 4A). In some embodiments, the cooking surface may comprise a well for receiving and cooking the eggs. For example, a cooking surface may be flat along the edges of the surface and comprise a shallow well in the middle of hot plate 430A to receive eggs to be cooked (i.e., egg white and/or yolk). The well may also help prevent egg white and/or yolk from sliding along and possibly off the cooking surface. A well may also help corral eggs during the cooking process, to make sure no amount of egg white and/or yolk does not get treated by spatula 432A. In some embodiments, the cooking surface of hot plate 430A may comprise a raised lip along one or more edges of the cooking surface to help prevent egg contents from falling off the edge of the hot plate 430A.

Eggs may be cooked on hot plate 430A using temperature control of hot plate 430A and physical manipulation with spatula 432A. In some embodiments, a temperature of hot plate 430A may be programmed to correspond to the specific cooking method. Thus, the temperature, or temperature profile, may be different for each cooking method. In some embodiments, the temperature of hot plate 430A may remain constant for the duration of the cooking. In some embodiments, the temperature of hot plate 430A may change throughout the duration of the cooking, to correspond to different phases of the cooking cycle.

In some embodiments, cooking component 400A may be configured to cook the egg(s) according to feedback from a detection system configured to detect and communicate to cooking component 400A the position of one or more components of the kitchen device. For example, a vision-based detection system may be used to detect and communicate to cooking component 400A the position of the egg(s), the orientation or shape of the egg, the position of the spatula 432A, etc. This feedback may also determine the movements of spatula 432A (i.e., based on the position, orientation, and/or shape of the egg(s)). Additionally, cooking component 400A may be configured to determine how "cooked" the egg(s) is/are using an infrared heat mechanism or a color recognition algorithm, for example.

In some embodiments, a kitchen device according to embodiments described herein may include a controller. The controller may be configured to a controller configured to receive a request for a cooked egg type (e.g., sunny-side up, scrambled, over easy) from a user. In response to receiving the request for the cooked egg type, the controller may be configured to transfer a raw egg from the storage component to the cracking component, and crack the raw egg such that the cooking component receives the cracked egg. In some embodiments, the controller may then be configured to cook the cracked egg in the cooking component, and transfer the cooked egg to the warming component for warming.

In some embodiments, hot plate 430A and/or spatula 432A may comprise a non-stick surface. A non-stick surface may reduce friction during cooking, minimize the amount of cleaning necessary, and add additional flavor to the cook eggs. For example, a non-stick surface may be achieved with a surface coating. Suitable non-stick surface coatings may include a fluoropolymer coating or a ceramic coating. Other methods of forming a non-stick surface can include a lubrication system, configured to lubricate the cooking surface of the hot plate 430A to prevent sticking. For example, a lubrication system may include a refillable storage container for a liquid fat extract and a method for delivering the liquid fat extract to hot plate 430A. In some embodiments, the method for delivering liquid fat may be a gravitational method or a pump. In some embodiments, a non-stick surface may be achieved with porous absorption of oil into a ferrous metal. For example, a cast iron material may be used for hot plate 430A.

In some embodiments, cooking component 400A may include a gutter system for catching and containing grease overflow and/or byproducts from the cooking process and for easy grease/byproduct removal and cleaning. The gutter system may be sloped downwards towards the trash receptacle to enable waste to flow into the trash receptacle. In some embodiments, the gutter system may comprise a non-stick or slick coating. A gutter system may also surround some or all of the cooking surface such that the gutter system is configured to catch debris that falls off the cooking surface and transfers it to the trash receptacle. In some embodiments, a wash down system may also be included to help clean and remove any buildup. A wash down system may include spray nozzles to assist in moving the cooking overflow and/or waste byproducts into the trash receptacle.

Once eggs have been cooked, they may be transferred to a warming component. In some embodiments, the transfer from cooking component 400A to a warming component may include gravitational and/or mechanical forces.

Once eggs have been cooked on hot plate 430A of cooking component 400A, they can be transferred to a warming component (e.g., warming component 500 of FIG. 5) for warming and receiving by a user.

FIG. 4B shows a cooking component 400B of a kitchen device, according to some embodiments. Cooking component 400B can include any features described above with respect to cooking component 400A. As shown, cooking component 400B can include hot plate 430B, spatula 432B, and control device 434B. Each of these components can include any features described above with respect to hot plate 430A, spatula 432A, and/or control device 434A.

FIG. 4C depicts a cooking component 400C comprising hot plate 430C. Hot plate 430C differs from hot plate 430A of FIG. 4A in that it is round and is configured to rotate about a central axis. In some embodiments, hot plate 430C also comprises raised edges to help prevent egg yolk and/or egg white from slipping off the surface of hot plate 430C during cooking. Hot plate 430C of FIG. 4C may include any of the features of hot plate 430A or 430B of FIG. 4A or 4B, respectively.

Warming Component

FIG. 5 shows a warming component 500 of a kitchen device according to some embodiments herein. Warming component 500 is configured to receive cooked eggs from a cooking component (e.g., cooking component 500 of FIG. 5), keep the cooked eggs warm, and transfer the cooked eggs to a user for consumption. Warming component includes a warming tray 530 and an access door.

Warming tray 530 is temperature-controlled to keep the cooked eggs warm until a user removes them from the kitchen device. In some embodiments, warming tray 530 may keep the cooked eggs warm by recycling or retaining warm air from the cooking process of the kitchen device. In some embodiments, warming tray 530 may keep the cooked eggs warm by recycling or retaining temperature-treated air from the heating/cooling system of a storage component (e.g., storage component 200A, 200B, or 200C of FIG. 2A, 2B, or 2C, respectively). In some embodiments, warming component 500 may include its own dedicated heating element, which may be used exclusively without the functionality sequence of the rest of the device. For example, a user may remove the cooked eggs from warming component 500, put cheese on top of the cooked eggs, and place the cooked eggs (with cheese) back into warming component 500. Additionally, a user may have other food products that he or she wishes to keep warm, and may place the other food products into warming component 500 to keep them warm.

A controller may be configured to regulate the warming temperature of warming tray 530 based on a user input. In some embodiments, a user may input a warming temperature. In some embodiments, a user may input a warming time. For example, warming tray 530 may, based on a user input, keep the cooked eggs warm for a certain amount of time. In some embodiments, warming tray 530 may be configured to keep the cooked eggs warm until a user has removed the cooked eggs from warming tray 530 and the kitchen device.

Warming component 500 may also include an access door, allowing a user to physically remove the cooked eggs from the kitchen device. In some embodiments, an access door may be configured to open and eject warming tray 530 with warmed cooked eggs. The user may then remove the cooked eggs from warming tray 530, and the access door may be configured to reinsert warming tray 530 into the kitchen device as the access door closes. In some embodiments, the access door may be configured to open and receive a plate from the user. The access door may then close, inserting the plate into the kitchen device to receive the cooked eggs. For example, warming tray 530 may be configured to gravitationally and/or mechanically transfer the eggs to the plate. Once the cooked eggs are transferred, the access door may reopen and eject the plate from the kitchen device and to the user. In some embodiments, access door is configured to open and close in a manner that allows thermal stabilization of the warming component in the kitchen device.

Cleaning System

In some embodiments, a kitchen device provided herein may include a closed-loop cleaning system, a closed-loop cleaning system may include, for example, a storage tank for holding a cleaning material, a method for removing residue from surfaces of the kitchen device, a filtering system for separating liquid from solid waste, a heating element, and/or a method of disinfection.

A storage tank may be drainable and/or refillable. In some embodiments, it may be configured to store a disinfectant, a grease-cutting antibacterial solution, or other cleaning solution for cleaning surfaces within the kitchen device. The cleaning solution may be used to remove any grease or oil buildup from the cooking surface(s).

The method for removing residue, or "unwanted leftovers" from surfaces of the kitchen device may be achieved with a pump. In some embodiments, the removal may be achieved using a gravitational system. The removed residue may be transferred to a filtering system to separate the liquid waste from the solid waste. After the residue is removed from surfaces within the kitchen device, a disinfection system may be used to clean and disinfect the surfaces. For example, a method of disinfection might include ultraviolet light, disinfecting fluid, soap, high-pressure nozzles, or a combination thereof.

In some embodiments, the closed-loop cleaning system may clean the kitchen device at regular intervals. For example, the cleaning system may be programmed to run once a day, once every three days, once a week, etc. In some embodiments, the cleaning system may be programmed to run after every cooking cycle, after every other cooking cycle, etc. In some embodiments, the cleaning system may be configured to run in response to a user input.

Graphical User Interface for User Control

In some embodiments, kitchen devices according to embodiments provided herein may comprise a graphical user interface. A graphical user interface may include, for example, a touchscreen that allows a user to control various process parameters. The user may indicate, using the touchscreen, a cooking method (e.g., scrambled, over easy, sunny-side up). In some embodiments, the user may also indicate with the touchscreen one or more temperatures (e.g., egg storage temperature of the storage component, hot plate temperature for cooking of the cooking component, warming temperature of the warming component). In some embodiments, the user may indicate one or more times. For example, the user may use the touchscreen to program a start time for the kitchen device. The user may also indicate cooking times (e.g., how "well-done" the eggs are cooked) or warming times. The user may also use the touchscreen to open the input access door to place raw eggs into the kitchen device at a storage component, to initiate a cleaning cycle, and/or to open the output access door to remove the cooked eggs.

In some embodiments, the graphical user interface may also include an electronic display. The electronic display can be used to indicate, to the user, one or more features of the kitchen device. For example, the electronic display may be configured to indicate when a cleaning cycle is running, the number of raw eggs in the tray of the storage component, the position of the raw eggs in the tray of the storage component, how long one or more raw eggs have been in the tray of the storage component, when a cooking cycle is taking place, the cooking method being used during an active cooking cycle, when the last cleaning cycle was completed, how often a cleaning cycle is programmed to run, when the next cooking cycle is programmed to run, how much cleaning fluid is remaining, how much lubrication oil is remaining, etc.

In some embodiments, a graphical user interface can include both the touchscreen and the electronic display.

In some embodiments, kitchen devices according to embodiments herein can include additional features such as wireless internet and/or Bluetooth connectivity. By connecting to a kitchen device remotely via wireless or Bluetooth connectivity, a user can control features of the kitchen device from his or her smartphone or other electronic device. For example, a user may be able to remotely control any or all of the features described with reference to the touchscreen.

Methods of Cooking Eggs Using Kitchen Devices Described Herein

Figure 6:
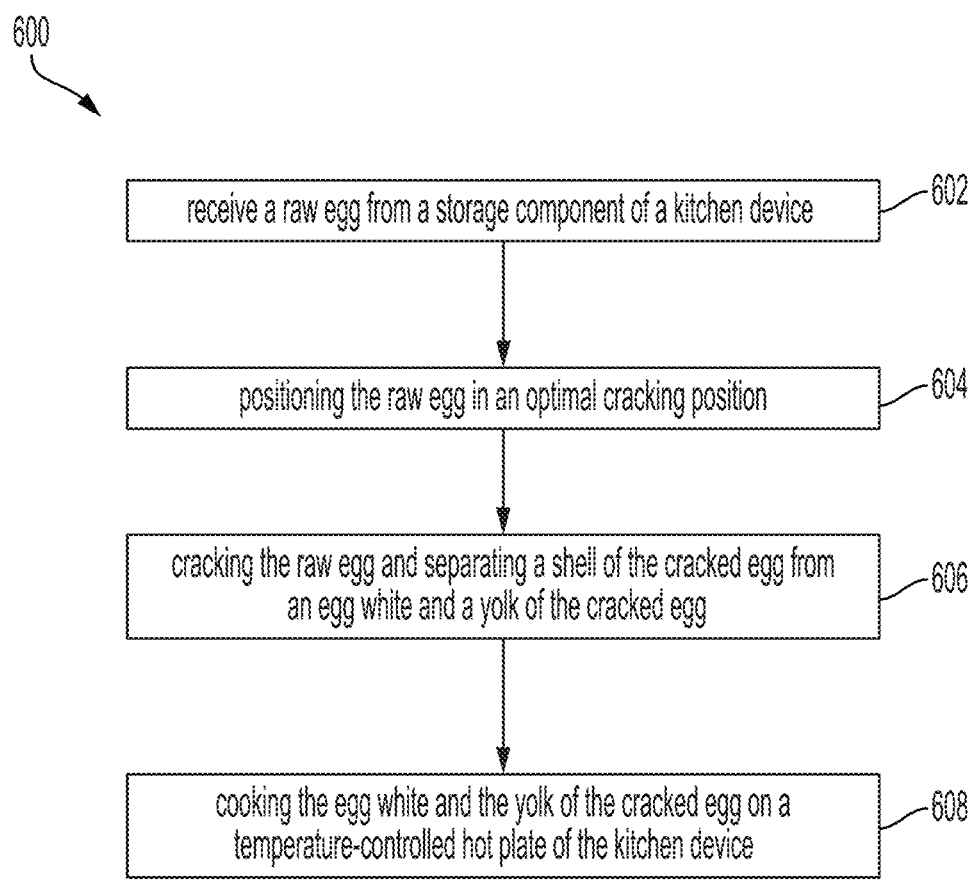
FIG. 6 provides a method of cooking an egg, according to some embodiments.

FIG. 6 shows a method of cooking eggs 600 using a kitchen device according to some embodiments herein.

Step 602 includes receiving a raw egg from a storage component of a kitchen device. For example, step 602 may be completed at storage component 200 of FIG. 2 and cracking component 300 of FIG. 2. Specifically, step 602 may include transferring the raw egg from a storage component (e.g., storage component 200A, 200B, or 200C of FIG. 2A, 2B, or 2C, respectively) to a cracking component (e.g., cracking component 300A, 300B, or 300C of FIG. 3A, 3B, or 3C, respectively).

Step 603 includes positioning the raw egg in an optimal cracking position. Step 602 may be completed at a cracking component (e.g., cracking component 300A, 300B, or 300C of FIG. 3A, 3B, or 3C, respectively).

Step 606 can include cracking the raw egg and separating a shell of the cracked egg from an egg white and a yolk of the cracked egg. Step 603 may also be completed at a cracking component of a kitchen device described herein (e.g., cracking component 300A, 300B, or 300C of FIG. 3A, 3B, or 3C, respectively). Separating a shell of the cracked egg from an egg white and a yolk of the cracked egg can include transferring the egg white and yolk to a cooking component of the kitchen device (e.g., cooking component 400A, 400B, or 400C of FIG. 4A, 4B, or 4C, respectively).

Step 608 includes cooking the egg white and the yolk of the cracked egg on a temperature-controlled hot plate of the kitchen device. For example, step 608 may be completed at a cooking component of a kitchen device described herein (e.g., cooking component 400A, 400B, or 400C of FIG. 4A, 4B, or 4C, respectively).

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method of cooking eggs with a device, the method comprising:
transferring an egg from a storage component of the device to a cracking component of the device such that the egg is positioned between a pusher and a sharp object of the cracking component;

advancing the pusher in a first direction to push the egg in position for cracking;
cracking the egg with the sharp object;
separating a shell of the cracked egg from an egg white and yolk of the cracked egg; and
cooking the egg white and yolk of the cracked egg in the device.

2. The method of claim 1, wherein the sharp object comprises at least two components and separating the shell of the cracked egg from the egg white and yolk of the cracked egg comprises separating the at least two components of the sharp object to retain the shell and allow the egg white and yolk to transfer to a cooking component of the device.

3. The method of claim 2, wherein the at least two components of the sharp object spread apart in a direction that is perpendicular to the first direction to open the shell and separate the egg white and yolk from the shell.

4. The method of claim 3, wherein the at least two components of the sharp object are flush together during cracking and spread apart after the egg has been cracked by the sharp object.

5. The method of claim 1, wherein the storage component comprises a plurality of cups, wherein each cup of the plurality of cups is configured to hold one egg of a plurality of eggs.

6. The method of claim 5, wherein at least one cup of the plurality of cups comprises an ejector configured to advance into an internal space of the at least one cup, and wherein transferring the egg from the storage component of the device to the cracking component of the device comprises advancing the ejector into the internal space of a cup holding the egg such that the egg is pushed out of the cup.

7. The method of claim 1, wherein transferring the egg from the storage component of the device to the cracking component of the device is performed using an outlet mechanism comprising one or more of a gravitational mechanism, a helical mechanism, a ramp, a belt, a paddle, a coil, and a cup.

8. The method of claim 1, wherein cracking the egg against the sharp object comprises puncturing the shell of the egg against a blade or awl.

9. The method of claim 1, wherein the pusher and the sharp object are diametrically opposed on opposite sides of the egg.

10. The method of claim 1, further comprising: after separating the shell of the cracked egg from the egg white and yolk of the cracked egg, transferring the shell to a trash receptacle via a gravitational ramp.

11. The method of claim 1, wherein cooking the egg white and yolk of the cracked egg in the device is performed using one or more temperature-controlled hot plates, a spatula controlled by a multi-axis robotic-controlled arm, and/or a vision detection system.

12. The method of claim 11, wherein cooking the egg white and yolk of the cracked egg in the device comprises: detecting, via the vision detection system, a position of the egg white and a position of the yolk in relation to the spatula; and cooking the egg white and the yolk on the one or more temperature-controlled hot plates based on the detected position of the egg white and the detected position of the yolk.

13. The method of claim 11, wherein cooking the egg white and yolk of the cracked egg in the device comprises: detecting, via the vision detection system, infrared heat emitted by the egg to determine a doneness level of the egg; and cooking the egg white and the yolk on the one or more temperature-controlled hot plates based on the detected infrared heat.

14. The method of claim 11, wherein the one or more temperature-controlled hot plates comprise one or more of a flat cooking surface, a cooking surface with a raised lip along one or more edges of the cooking surface, and a curved heating surface.

15. The method of claim 1, wherein the kitchen device comprises a controller and a graphical user interface.

16. The method of claim 15, wherein cooking the egg white and yolk of the cracked egg in the device comprises: receiving, at the controller of the kitchen device, a request for a cooked egg type from a user via the graphical user interface, wherein the cooked egg type comprises one or more of scrambled, over easy, and sunny-side up; and cooking, using the one or more heating mechanisms of the cooking component, the egg white and the yolk in accordance with the cooked egg type requested.

17. The method of claim 15, wherein cooking the egg white and yolk of the cracked egg in the device comprises: receiving, at the controller of the kitchen device, a plurality of process parameters from a user via the graphical user interface, wherein the plurality of process parameters includes one or more of a cooking method, a cooking start time, or a cooking temperature; and cooking, using the one or more heating mechanisms of the cooking component, the egg white and the yolk in accordance with the plurality of process parameters.

18. The method of claim 1, wherein the device is configured to cook a plurality of eggs.

19. The method of claim 1, further comprising: after cooking the egg white and the yolk, warming the cooked egg white and the cooked yolk using warm air formed by and recycled from the cooking component.

20. A device for cooking eggs, the device comprising:
a storage compartment configured to hold a plurality of eggs;
a cracking component comprising:
a pusher configured to advance in a first direction, and
a sharp object comprising at least two components configured to spread apart in a direction that is perpendicular to the first direction,
wherein the cracking component is configured to receive at least one egg from the storage compartment such that the at least one egg is positioned between the pusher and the sharp object and the cracking component is configured to crack the at least one egg with the sharp object and to separate the at least two components of the sharp object to separate a shell of the at least one cracked egg from the egg white and yolk of the at least one cracked egg; and
a cooking component configured to receive the egg white and yolk from the cracking component and to cook the egg white and yolk on one or more temperature-controlled hot plates.

* * * * *